(12) United States Patent
Didomenico et al.

(10) Patent No.: US 11,531,442 B2
(45) Date of Patent: Dec. 20, 2022

(54) USER INTERFACE PROVIDING SUPPLEMENTAL AND SOCIAL INFORMATION

(71) Applicant: CRACKLE, INC., Sausalito, CA (US)

(72) Inventors: Tarik Didomenico, Santa Monica, CA (US); Victor Thompson, Santa Monica, CA (US)

(73) Assignee: CRACKLE, INC., Sausalito, CA (US)

( * ) Notice: Subject to any disclaimer, the term of this patent is extended or adjusted under 35 U.S.C. 154(b) by 345 days.

(21) Appl. No.: 14/480,592

(22) Filed: Sep. 8, 2014

(65) Prior Publication Data

US 2015/0074534 A1 Mar. 12, 2015

Related U.S. Application Data

(60) Provisional application No. 61/874,825, filed on Sep. 6, 2013.

(51) Int. Cl.
| | |
|---|---|
| *G06F 3/0481* | (2022.01) |
| *G06F 3/0484* | (2022.01) |
| *G06Q 50/00* | (2012.01) |
| *G06F 3/0482* | (2013.01) |
| *G06F 16/78* | (2019.01) |
| *G06F 16/74* | (2019.01) |
| *G06F 16/783* | (2019.01) |

(52) U.S. Cl.
CPC .......... *G06F 3/0481* (2013.01); *G06F 3/0482* (2013.01); *G06F 3/0484* (2013.01); *G06F 16/748* (2019.01); *G06F 16/78* (2019.01); *G06F 16/783* (2019.01); *G06Q 50/01* (2013.01)

(58) Field of Classification Search
CPC .... G06F 3/0481; G06F 3/0484; G06F 3/0482; G06F 16/78; G06F 16/748; G06F 16/783; G06Q 50/01
USPC ................................... 715/716, 719
See application file for complete search history.

(56) References Cited

U.S. PATENT DOCUMENTS

| | | | |
|---|---|---|---|
| 8,832,760 B2 | 9/2014 | Eklund | |
| 9,588,647 B1* | 3/2017 | Lewis | .................. G06F 3/0482 |
| 2009/0164902 A1* | 6/2009 | Cohen | .................. G10H 1/0025 |
| | | | 715/716 |

(Continued)

OTHER PUBLICATIONS

Author Unknown, "Building Graph Search" downloaded at : https://www.facebook.com/media/set/?set=vb.20531316728&type=2#!/photo.php?v=10200156550214780&set=vb.20531316728&type=3&theater Publication date Jan. 15, 2013, 3 pages.

(Continued)

*Primary Examiner* — Phuong H Nguyen
(74) *Attorney, Agent, or Firm* — Mayer & Williams, PC; Stuart Mayer

(57) ABSTRACT

Systems and methods are provided which implement techniques for providing supplemental and social information along with primary information. In one implementation, a user interface is provided with various sections. One section plays back a main item of content, while a second section displays supplemental information. A third section provides interactive tools for a user to communicate or share information with other users. For example, while playing a movie in the first portion, the social networking section may provide a chat interface in the third portion along with social network service controls to post or share user input, or to view posts from friends about the item of content.

34 Claims, 16 Drawing Sheets

(56) References Cited

U.S. PATENT DOCUMENTS

| | | | |
|---|---|---|---|
| 2010/0199295 A1* | 8/2010 | Katpelly | G06F 17/30053 725/14 |
| 2010/0208082 A1* | 8/2010 | Buchner | H04H 20/18 348/207.1 |
| 2010/0235391 A1 | 9/2010 | Eklund | |
| 2012/0173981 A1 | 7/2012 | Day | |
| 2013/0110929 A1* | 5/2013 | Gundotra | H04L 65/4084 709/204 |
| 2013/0227038 A1* | 8/2013 | Rich | H04L 29/06476 709/206 |
| 2013/0302005 A1* | 11/2013 | Harwell | H04N 21/2408 386/200 |
| 2014/0012905 A1* | 1/2014 | Roche | H04L 51/36 709/204 |
| 2014/0047049 A1* | 2/2014 | Poston | H04L 51/32 709/206 |
| 2014/0188997 A1* | 7/2014 | Schneiderman | H04L 51/32 709/204 |
| 2014/0214920 A1* | 7/2014 | Wong | H04N 21/47202 709/203 |
| 2014/0280564 A1* | 9/2014 | Darling | G06Q 50/01 709/204 |

OTHER PUBLICATIONS

Author Unknown, Google Plus " downloaded at https://plus.google.com/photos/111072084105105003257/albums?banner=pwa&gpsrc=pwrd1#photos/111072084105105003257/albums/5937136200123348769" Publication dAte: Oct. 21, 2013.

Author Unknown, Samsung Music Player downloaded at "http://www.phonearena.com/reviews/Samsung-Galaxy-Tab-2-10.1-Preview_id2980/page/2" 7 pages, published Mar. 21, 2012.

* cited by examiner

USER INTERFACE PROVIDING SUPPLEMENTAL AND SOCIAL INFORMATION

CROSS-REFERENCE TO RELATED APPLICATIONS

This application claims the benefit of priority of U.S. Provisional Patent Application Ser. No. 61/874,825, filed Sep. 6, 2013, entitled "User Interface Providing Supplemental Information", which is incorporated by reference herein in its entirety.

FIELD

The invention relates to video playback, and in particular to enhanced video players for displaying information in addition to video content.

BACKGROUND

Video playback of content is ubiquitous, but tends to be an isolated experience in the sense of what is viewed. Users may view video content, and may have questions about the content that may be answered by web searching. Similarly, users may wish to share questions, comments, or even emotions experienced during viewing with others. However, current solutions for such users typically either require the user to open an entirely new window, which generally blocks viewing of the main item of content and thus requires resizing and reorganization of the windows, or requires the user to engage another device at the same time. In other words, there is currently no convenient solution for such users.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to present principles meet the needs of the above in several ways. In particular, systems and methods are provided which implement a technique for providing supplemental and social information along with primary information. In one implementation, a computer system provides a user interface with various sections. One section includes a media player such as a video player, that can display and playback content, in particular a main item of content. In addition to the content display in the media player, the user interface also provides a second portion for displaying supplemental information, termed a peripheral information section. For example, while playing a movie in the first portion, the user interface may display information about actors that are in the movie in the peripheral information section. The user interface also provides a third portion which provides interactive tools for a user to communicate or share information with other users, termed a social networking section. For example, while playing a movie in the first portion, the social networking section may provide a chat interface in the third portion along with social network service controls to post or share user input.

In one aspect, the invention is directed towards a method for controlling a user interface in a computer system, including: displaying a media player in a user interface displayed on a display device, the media player for displaying a main item of content; displaying a peripheral information section in the user interface, the peripheral information section for displaying information about the main item of content; displaying a social networking section in the user interface, including one or more social networking controls; receiving a command to activate a selected one of the social networking controls; and sending information about the main item of content to one or more social networking services associated with the social networking section.

Implementations of the invention may include one or more of the following. The user interface may be a modal window or a pop-up window. The method may further include receiving a close command, minimizing the media player, and hiding the peripheral information section and social networking section. The media player may be configured to display a multi-scene item of video content. The peripheral information section may be configured to show specific information about a current scene of the multi-scene item of video content being played back in the media player. The specific information about the current scene may be based on facial recognition, or may be based on or determined by user comments about the scene in a social networking service or media sharing site. The peripheral information section may be generated based on metadata associated with the main item of content.

The media player may be configured to be associated with a user profile, the user profile associated with the one or more social networking services, and the social networking section may be generated based on data about a plurality of users' respective interests in the main item of content, the plurality of users including users associated as friends with the user profile. The method may further include configuring a related media section to appear in the user interface, the related media section displaying links or thumbnails to media viewed, liked, or commented on by other users of the one or more social networking services. The media viewed, liked, or commented on by the plurality of users may include scene links to scenes from the main item of content, the scene links including metadata about where the scene begins in the main item of content, such that activation of the scene link causes playback to begin at the beginning of the scene, whereby the scene may be shared without editing the main item of content. The users' respective interests may be determined by views, likes or comments on the main item of content, the views, likes, or comments associated with the main item of content by association with a URL of the main item of content. The users' respective interests may be determined by likes or comments on the main item of content, the likes or comments determined to be associated with the main item of content by a likeness in keywords. The users' respective interests may be determined by the friends' mentions of a title of the main item of content in entries in the social networking services.

The social networking section may include social network links to a plurality of social networking services. The social network links may access feeds to the social networking services. Upon activation of a social network link, metadata about the played back content item may be converted to a form appropriate for the accessed feed. Upon activation of a social network link, a posting to a social network corresponding to the activated link may be performed, the posting including metadata about the played back content item extracted from the peripheral information section. The social networking section may further include a user editable form configured to allow a user to enter text, such that the entered text can be converted to a form appropriate for the accessed feed and posted on the social network. The social networking section may further include a chat interface, a forum interface, or a blog interface. The method may further include displaying a rolling ticker within a frame, e.g., where the rolling ticker includes information drawn from friends' posts on the social networking services related to the main item of content being played back on the media player. The method may further include causing a related media section to appear in the user interface, the related media section displaying links or thumbnails to media related to content being played back.

The method may further include, upon activation of a link in the peripheral information section or the social networking section, causing the other of the peripheral information section or the social networking section to be occupied by a frame or window corresponding to the activated link. Upon activation of a link in the peripheral information section, the method may further include displaying information in the social networking section, the information corresponding to the results of the activated link in the peripheral information. Upon activation of a link in the social networking section, the method may further include displaying information in the peripheral information section, the information corresponding to the results of the activated link in the social networking.

The method may further include, upon activation of a link in the peripheral information section or the social networking section, causing the other of the peripheral information section or the social networking section to be occupied by a frame or window corresponding to the activated link, and the occupying frame or window, corresponding to the activated link, may include information based at least in part on the user profile, such as friends information. The friends information may include posts or other social networking entries based on the main item of content or metadata therefrom. The method may further include, upon activation of a link in the peripheral information section or the social networking section, causing the peripheral information section or the social networking section, respectively, to be occupied by a frame or layer or window corresponding to the activated link. The process of providing information in one frame or layer or window caused by activation of an element in the other may be performed a number of times over to "drill down" to a desired level of information. Such may also be accomplished in some implementations by providing the additional information in the same window or layer or frame as the activatable link. In some implementations, a hybrid method may be employed, where some information is caused to appear in a different window or layer or frame while other information is caused to appear in the same window or layer or frame.

The method may further include sizing and configuring the user interface for the display device such that the media player, the peripheral information section, and the social networking section are visible in their entirety on the display device without scrolling, while one or more (or all) of the peripheral information section and the social networking section are individually scrollable. The user interface may be part of a web application, e.g., where the web application is associated with a social networking site or a media sharing site. The user interface may be a client application on the computer system, and the client application may be in communication with a service. The service may be a social networking site or media sharing site. The displaying steps, of displaying a media player, displaying a peripheral information section, and displaying a social networking section, may be configured such that respective data sets corresponding to the displayed sections are accessed substantially simultaneously, are substantially simultaneously displayed, and further are updated substantially simultaneously, whereby the system enables access to three data sets in a controlled and efficient and/or optimized manner.

In a related aspect, the invention is directed towards a non-transitory computer-readable medium, including instructions for causing a computing environment to perform the above method.

In yet another aspect, the invention is directed towards a system for controlling a user interface in a computing environment, including: a display module for displaying a user interface on a display device, the user interface including: a media player for displaying a main item of content, a peripheral information section for displaying information about the main item of content, and a social networking section including one or more social networking controls; and an expansion module for, upon reception of a command to display additional information pertaining to an activated element within the peripheral information section or the social networking section, causing the additional information pertaining to the activated element to be displayed within the other of the peripheral information section or the social networking section.

In yet a further aspect, the invention is directed towards a system for controlling a user interface in a computing environment, including: a display module for displaying a user interface on a display device, the user interface including: a media player for displaying a main item of content, a peripheral information section for displaying information about the main item of content, and a social networking section including one or more social networking controls; and a social network interface module for, upon reception of a command to post an entry pertaining to the main item of content to a social networking service, extracting metadata from the peripheral information section, the social network interface module configured to construct the post at least partially based on the extracted metadata.

The modular system described above can be employed to perform other functionality described here, by incorporation of other suitable modules.

Advantages of the invention may include, in certain embodiments, one or more of the following. The systems and methods allow organized and simultaneous presentation of content and supplemental information. The systems and methods further provide social tools for communication and sharing while presenting content. In some implementations, the systems and methods according to present principles allow content, information about content, and social networking features, to appear in one location without requiring any scrolling by the user.

Certain systems and methods according to present principles may provide significant technological advances to the computing environments in which they operate. For example, a single or unified user interface provides a simultaneous display of multiple sections which may require fewer or more efficient operations on the part of the processor, benefiting the same with better performance and speed, as well as better memory usage, both on the part of the processor and on the part of a graphics card or graphics processor. The systems and methods may make more efficient usage of network resources as well, allowing certain resources, e.g., those in the peripheral information section and social networking section, to be loaded prior to being called by a user. By using data from different data sets, e.g., three different data sets (content, peripheral information, and social networking), data from the different sets may be more conveniently extracted and drawn from to inform, as the basis of calculations, displays within other sections. The same sectioning further enhances operation of the graphics card or graphics processor, by ensuring screen real estate is employed for intended elements (the sections) and is not used otherwise, allowing other areas of screen real estate be employed for other windows and functionality. Moreover, by localizing the sections in a unified user interface, which may be sized to not require scrolling, important system resources need not necessarily be devoted to providing a scrollable window for the user interface, although such may be employed in certain implementations for added functionality.

Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Like reference numerals refer to like elements throughout. Elements are not to scale unless otherwise noted.

DETAILED DESCRIPTION

When viewing content in a media player on a computer system, a user may want to see additional information related to the content. The user may also want to communicate and share information with other users about the content. The present disclosure describes systems and methods to present content, information, and social tools within a computing environment.

Figure 1:
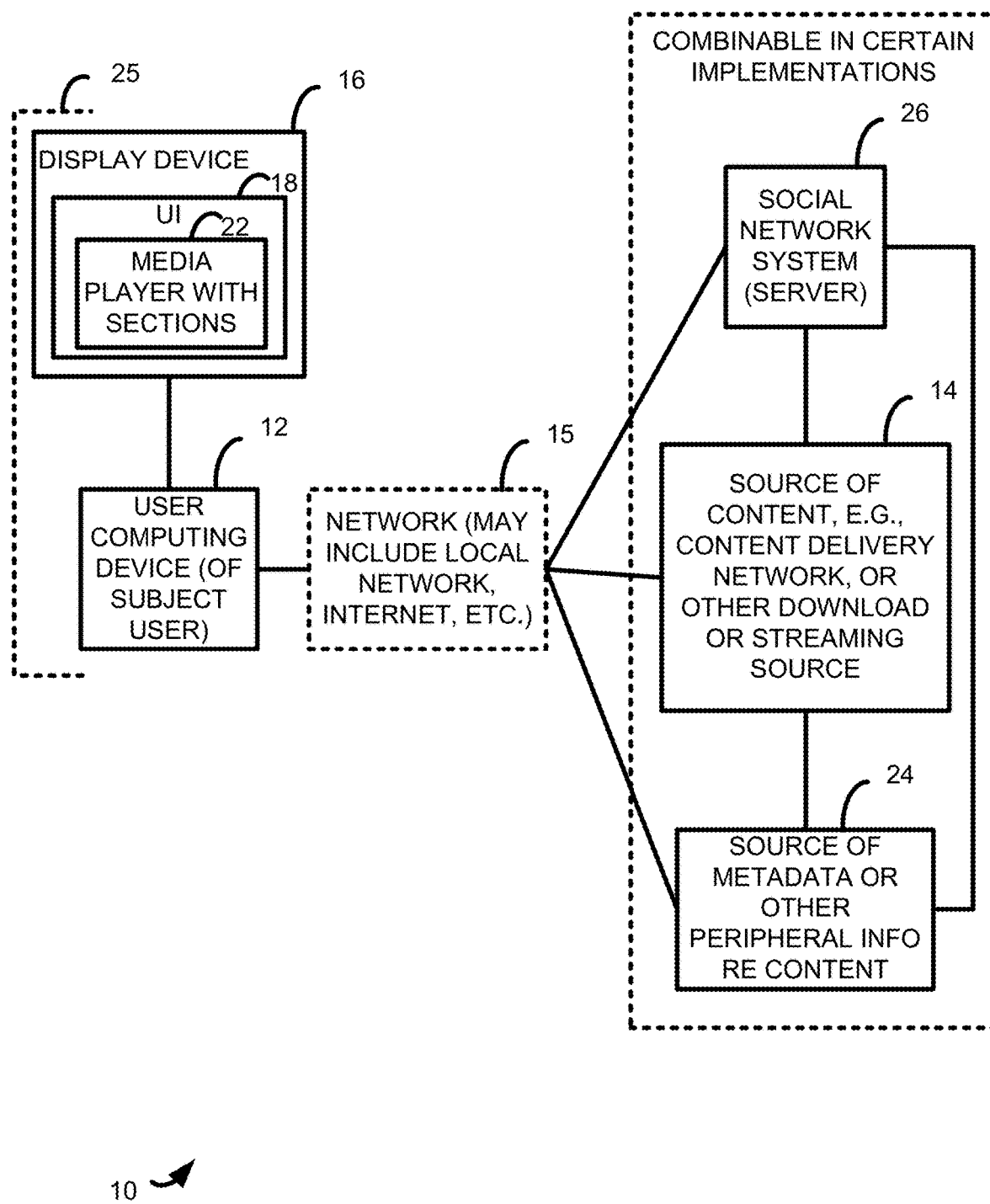
FIG. 1 is a logical diagram showing one implementation according to present principles.

Referring to FIG. 1, in one implementation the system 10 includes a computing environment such as a user computing device 12 which is signally coupled to a source of content 14. The user computing device may be of various sorts, including a desktop computer, a laptop computer, a tablet computer, a handheld computer, a smart phone, a gaming console including a portable gaming console, or the like. The source of content 14 may be a content delivery network, a download or streaming site, a service such as Crackle®, Netflix® or Amazon-On-Demand®, and so on.

The user computing device 12 may be signally coupled to the source of content 14 through a network 15, which in many cases includes the internet and may further include a local network or other networks. The network 15 may include wired networks, wireless networks, as well as hybrid such networks. The user computing device 12 may display a rendered output on a display device 16, the display device 16 and the user computing device 12 together constituting a user computing environment 25.

In one implementation, the user computing environment 25 operates an application having a user interface 18. The user interface 18 may include a media player 22 such as a video player, audio player, plug-in, or other module configured to play media. In use, the media player portion or section 22 presents or plays video, image, and/or audio content. The media player plays content items (e.g., movies, television or web programs, music, images) with play commands (e.g., buttons or pop-up controls visible on mouseover). When a user selects or activates a play command for a movie (or other content), the media player plays back the content within its section or alternatively presents a separate playback layer for playback, which may also include additional controls for viewing the content, e.g., play, pause, rewind, fast-forward, etc.

The user computing environment 25 may further be signally coupled to a social network, i.e., a server 26 operated by a social networking site or service, as will be described in greater detail below. The user computing environment 25 may further be signally coupled to a source 24 of metadata or other peripheral information about content, e.g., about a main item of content being played back on the media player 22, also as described in greater detail below. In this way, the user computing environment may receive and display metadata about a content item, e.g., the main item of content being played back in the media player.

It will be understood that the components 14, 24, and 26 may in many cases be combined, in any combination or sub-combination. For example, a social network may host content for playback, and such content may be associated with or even contain metadata about the content. In another example, a video filesharing site, which includes subscription-based services, may have a social networking component, or may have an API to a separate social network. Metadata may be hosted by the video filesharing site, or may be sourced or extracted from a separate database. The service accessed by the user computing environment 25 may be standalone and may access one or more social networking sites or services and content sources, or may form a portion of the same.

The user interface 18 may be implemented by a single window in which separate frames are defined for the social networking section, media player, and peripheral information section. Alternatively, each may occupy its own window which when combined form the user interface 18.

The user interface 18 may be a pop-up window or in some cases a modal window or layer, which is a graphical control element subordinate to an application's main window. In this way, users may enjoy and consume content, including a main item of content, but may easily return to an underlying window by, e.g., clicking on the underlying window. In some implementations, clicking on the underlying window will not close the pop-up window or modal window but will minimize the same, such minimization described below with respect to FIG. 11. Using modal windows or pop-up windows is distinct from, e.g., clicking a link to a video filesharing site, where return to the prior page is accomplished by a browser's "BACK" button or the like, which is in many cases a more involved and time-consuming step. Modal windows or pop-up windows in many cases also load in a more rapid fashion then a new webpage. It should be noted that the user interface need not be a modal window, but may also be other sorts of overlying layers. In addition, in some cases the entire user interface of the application is a modal window or a pop-up window, and in other cases just a portion is. In this case the portion may be modal with respect to certain contents on the display screen but not others. For example, the media player may be represented by a modal window, while the user is still enabled to operate and control features on the social networking section and peripheral information section. In some cases a subject user may use a web application to log onto a service on which the user interface 18 is presented, and the login process logs the user into a user profile. The service may employ an API with one or more social networking services or sites which, employing the user profile, can access data about the user and their friends. In this implementation the service may be a social networking site itself, a media sharing site, a separate site specifically designed for implementation of the user interface with access to one or more social networking services or media sharing sites, or the like. In another implementation, the user interface 18 is part of a client which has dedicated access to a service, where again the service may be as described above and may access various social networking sites and media sites.

Figure 2:
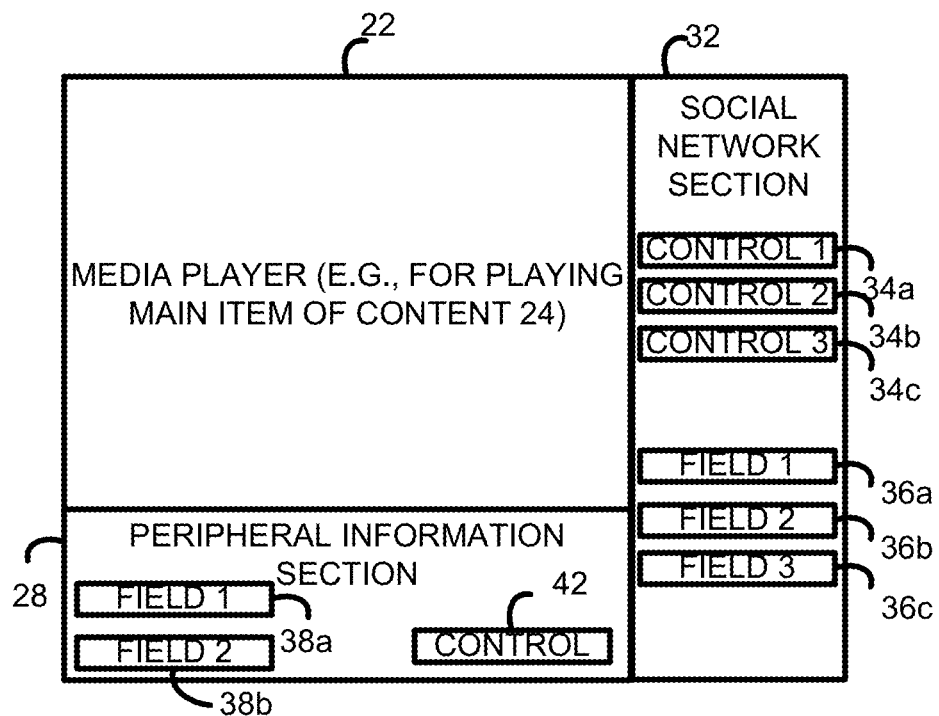
FIG. 2 is an exemplary implementation of a user interface according to present principles, showing a media player, a social networking section, and a peripheral information section.

Referring to FIG. 2, the user interface 18 may include a media player 22, e.g., a video player, and sections for peripheral information (section 28) and social networking (section 32). The social networking section 32 is illustrated with various exemplary controls 34*a*, 34*b*, and 34*c*. Such controls allow users to post on a social network, including to "like" the main item of content, to comment on the same, to have a comment associated with a page devoted to the main item of content or a network playing the same, or the like. Other variations will also be understood. The social networking section 32 may further include fields 36*a*, 36*b*, and 36*c*, the same providing data or other information about the main item of content or related content from various sources including from a plurality of users constituting the "friends" associated with the user profile. Other modules within the social networking section are described below. The peripheral information section 28 may also include fields, shown in FIG. 2 as fields 38*a* and 38*b*. Such fields may include information drawn or extracted from metadata about the main item of content, including actors, genre, director, rating, reviews, comments, year of release, and so on. The peripheral information section 28 may also include one or more controls 42, e.g., links to access further information. For example, a control 42 may include an actor link which when activated takes the user to a page devoted to the actor, e.g., showing prior movies, interests, or the like. Generally in this application the term "field" is used to mean text, images, or other data, while the term "control" is used to mean interactive, selectable or otherwise activatable elements, including links or the like. In some cases fields may be interactive as well, e.g., such as where the field constitutes an editable text field, in which case a user may interact with the field to have editable text posted.

These additional sections form one or more "sidecars", supplementing the playback experience. In one implementation, the video player for a movie uses 60% of the space and the rest is used for displaying peripheral and social content related to the movie. In another implementation, the criteria for selecting and presenting peripheral information uses multiple parameters (e.g., movie genre, actor, user age, additional episodes, etc.), and goes from most specific to less relevant. Most specific content is that directly related to the movie. Less relevant content may be presented with less space or can be found by searches (e.g., using a metadata, keyword, or tag system).

In one example, the video player is presented in a frame from the top left of the interface. Additional information and controls are presented in frames adjacent the player frame. Peripheral information about the movie is presented in a frame below the media player frame, e.g., in the peripheral information section 28. Social items are presented in a frame to the right of the media player frame, such as controls or social networking links for social services such as Facebook® and Twitter® or to a blog interface (e.g., for the user to make or read blog posts), e.g., in the social networking section 32. In one implementation, the user interface 18 is configured and sized to fit within a display area of the display device without requiring the user to scroll to see the entirety of the user interface 18. However, to allow access to other data within the user interface, certain individual sections, e.g., the social networking section 32, the peripheral information section 28, or a rolling ticker section (described below), may be scrollable.

Figure 3:
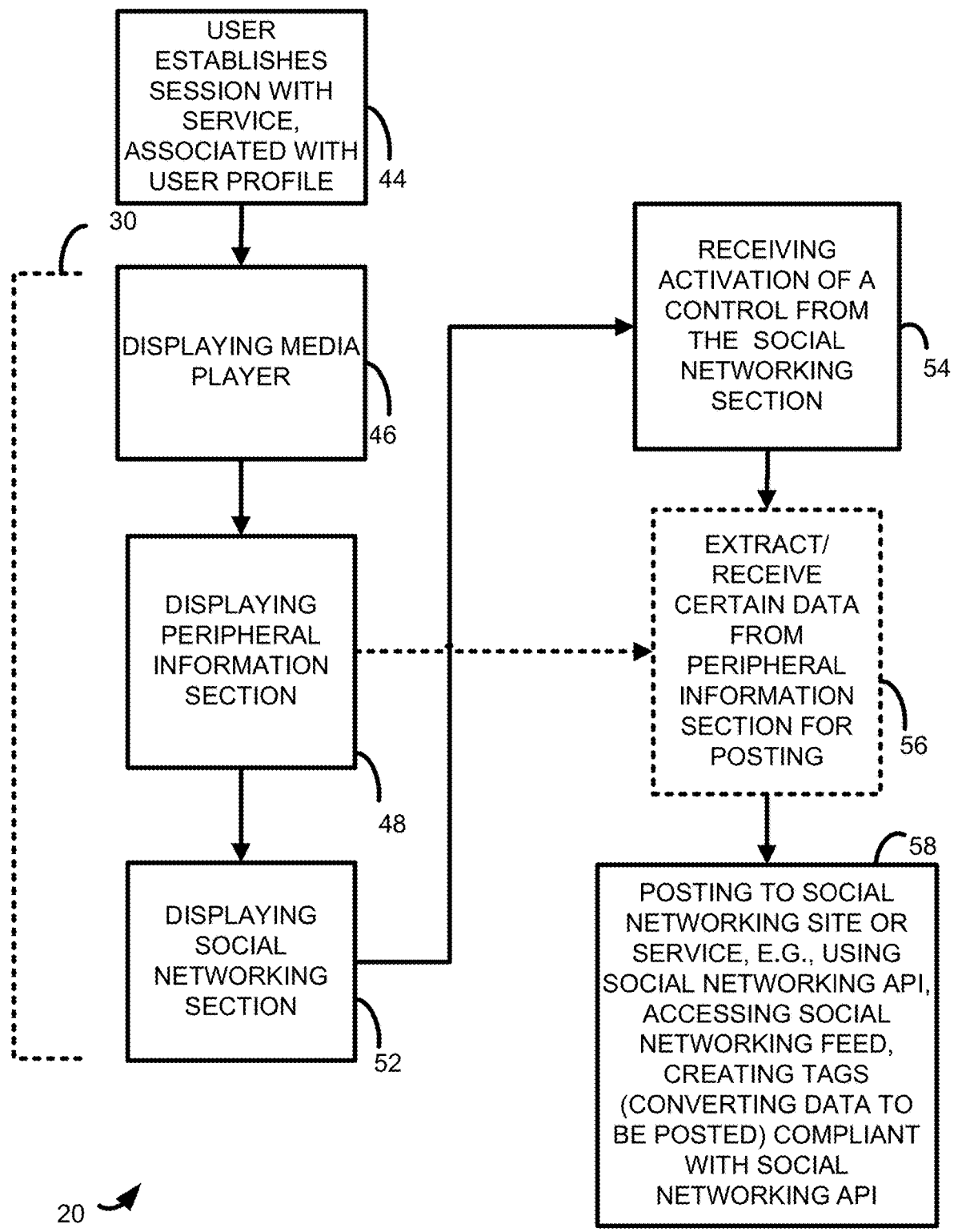
FIG. 3 is a flowchart of a method according to present principles.

Referring to FIG. 3, a flowchart 20 is shown corresponding to a method for employing the user interface to allow interactions with a social network, media sharing site, or other site with a social component. In a first step, a user establishes a session with a service (step 44). The session is generally associated with a user profile. As noted above, the service may be a social networking site, a media sharing site which can access one or more social networking sites or services through an appropriate API, a dedicated service acting as a portal to social networking sites and media sharing sites, or the like.

The next steps describe the display of the user interface (step 30), which as described above may be implemented using a modal window. In a first step, the media player is displayed (step 46). In a next step, the peripheral information section is displayed (step 48). Finally, the social networking section is displayed (step 52). These steps may be performed in any order or simultaneously. These sections may further be employed within different frames, windows, or any combination of frames and/or windows.

A next step is that the system may receive activation of a control from the social networking section (step 54). For example, the user may be viewing an item of content, and the user may wish to "like" or comment on the content. The user activation of the control may then cause a posting to a social networking site or service (step 58).

The posting may be accomplished in a number of ways, including by accessing a social networking feed associated with the social networking site or service, by formatting data (desired by the user to be posted) into a form compliant with an API for the social networking site or service, or the like. Additional details about posting to social networking sites or services may be found in U.S. patent application Ser. No. 13/076,937, filed Mar. 31, 2011, entitled "Social Networking Feedback Via Second Display Selections" and Ser. No. 13/232,598, filed Sep. 14, 2011, entitled "Second Display Interaction With Social Networking Feed", the entireties of both being incorporated by reference herein.

In a particular implementation, metadata may be received or extracted from the peripheral information section (step 56) and the metadata used as a portion of the posting or as part of the basis for the posting. In this way, a portion of data used in the social networking section is drawn from the peripheral information section.

In another implementation, a social item is initially presented in a summary or minimized form. Upon selection or activation (e.g., clicking with a mouse), the item expands to provide more information and a larger interface, hiding other items. In one implementation, the user can control transparency or size to manage visibility of the other items. Alternatively, the item can expand into a new layer or window. The user can close the expanded view to see the summarized view again (e.g., using a back or close control). This aspect is also true of the peripheral information section, in which in some cases activation of an element within the peripheral information section can cause a frame or window associated with the same to expand and to display information about the activated element. For example, if an activatable element within the peripheral information section corresponds to a movie genre, clicking on the genre may lead to other films of the genre being suggested and such suggested films being displayed in the peripheral information section instead of or above other elements such as control 42 and fields 38a and 38b. In such an implementation, the suggested films may be further filtered based on information about "friends" within associated social networks. For example, instead of any films of the selected genre being displayed, only films liked by the user's friends may be displayed, or only films liked by a specified percentage of the user's friends, or only films given three stars and up by the user's friends. Clearly numerous variations of this will be understood given this disclosure.

Figure 4:
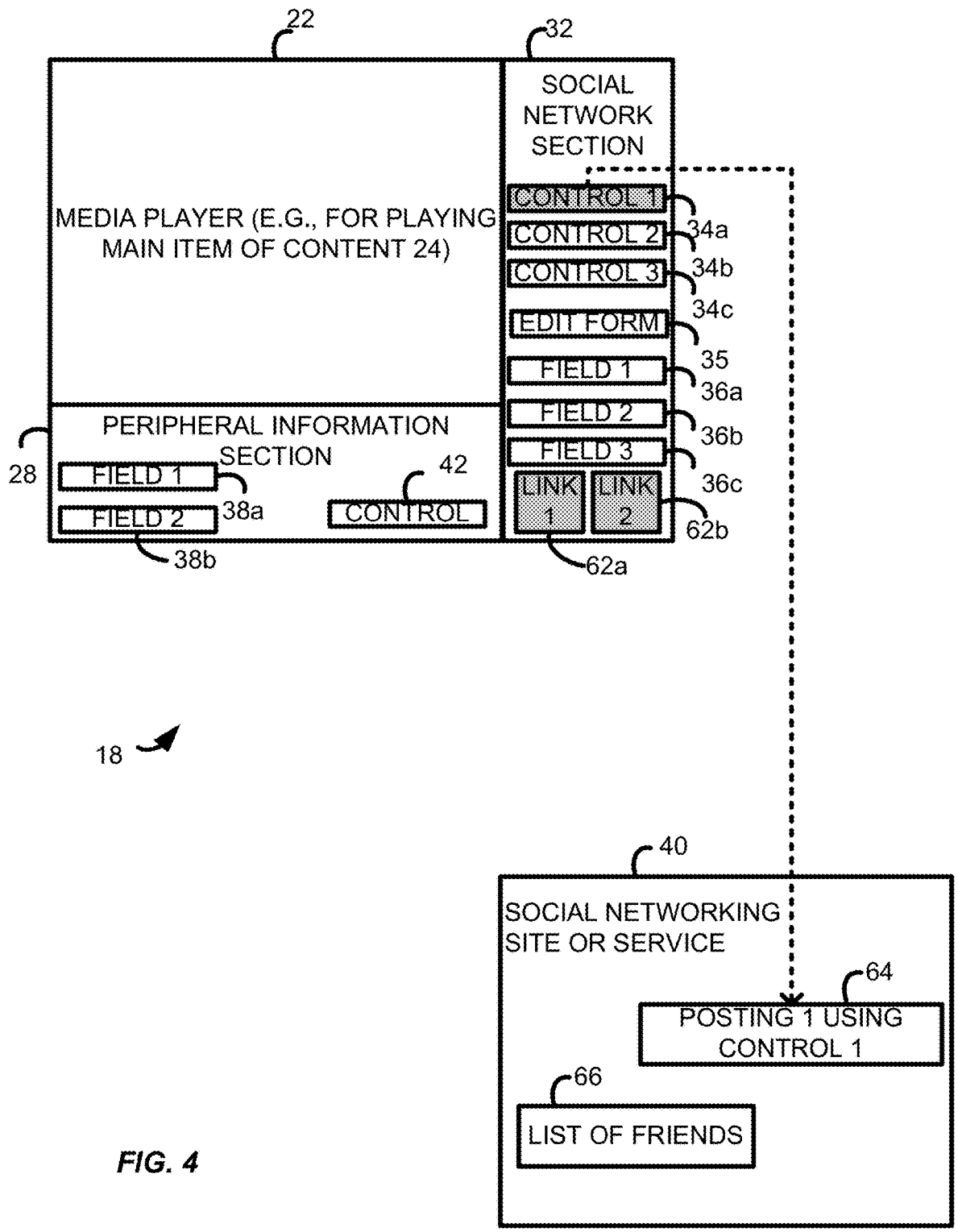
FIG. 4 is an exemplary implementation of a user interface according to present principles, showing in particular how activation of a control in the social networking section causes a posting in a social networking site or service.

FIG. 4 illustrates an implementation of the method of flowchart 20 within the user interface 18, in which activation of a control 34a within the social networking section 32 causes a posting 64 to occur within a social networking site or service 40. For example, the posting may indicate "Hey, I really liked this movie and I recommend it to others!". The social networking site or service 40 further is shown to illustrate a list of friends 66, these friends associated with the user profile. FIG. 4 also shows various social networking links 62a and 62b, indicating a plurality of social networking sites or services which may be accessed using the social networking section 32. The user profile may contain or may access suitable credentials to allow access to multiple sites.

Figure 5:
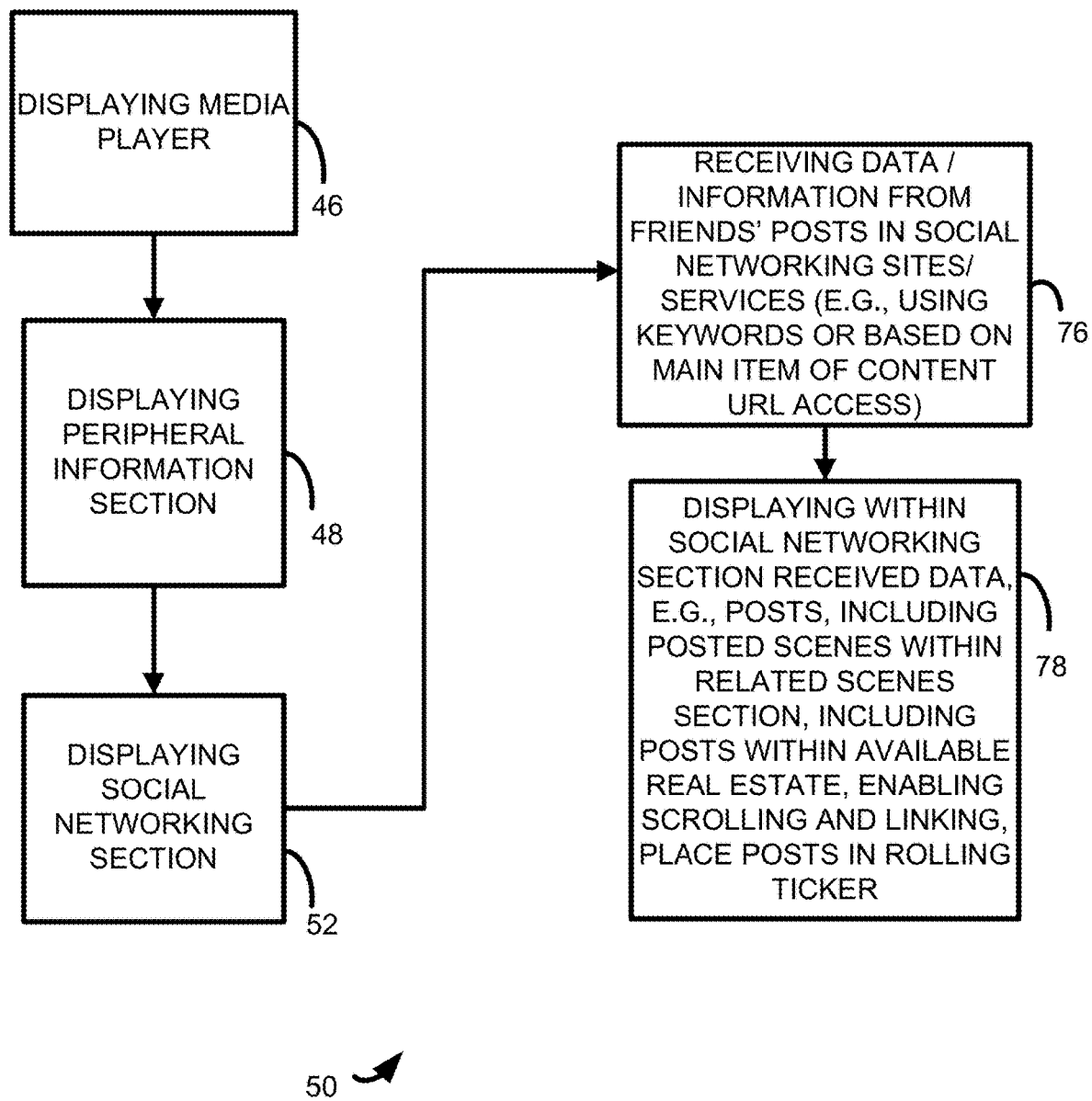
FIG. 5 is a flowchart of another method according to present principles.

FIG. 5 illustrates another aspect related to social networking. For clarity, steps of establishing a user session are understood from above and are not repeated here. The steps 46, 48, and 52 are as described above. In this figure, a flowchart 50 is shown for a method of employing a user's social network to populate the social networking section 32.

A first step is to receive data or other information from friends' social networking sites or services (step 76). Friends are known by association with the user profile, and using an appropriate API information may be determined about the friends, and in particular about the friends' interaction with the main item of content (or related content). For example, if a friend has watched the same item of content (as evidenced by access to a URL having the content), a notation to this effect can be placed in the social networking section. In the same way, if a friend has commented on the content, a notation may be made. For example, in this case, a keyword search may be made to determine if the user has mentioned the title of the content in a post. Alternatively, if the content has its own page, e.g., a link to a movie database, posting of a link will indicate that the friend has accessed the content and an entry about the same may be displayed in the social networking section.

A next step is to display the post within the social networking section (step 78). The posts may be of the type noted above, e.g., notations of friends' "likes" or comments about an item of content, check-ins indicating where they viewed the content, e.g., at a movie theater, posting within a ticker, or the like.

In some cases the posts may be sorted by date, so that the user sees the most recent posts first. Such posts may often be placed in a rolling ticker 138, as is described below in connection with FIG. 14. Due to the number of potential posts, the social networking section may be enabled to be scrollable, so that a user may scroll up or down to the posts or other entries they desire. Functionality may be further enabled such that, if a friend comments on a related content item (e.g., a prequel or sequel), the title of the related content item may be made an activatable element, such that activation of the same leads to the related content item being displayed (and played back) in the media player instead of the original "main" item of content.

Figure 6:
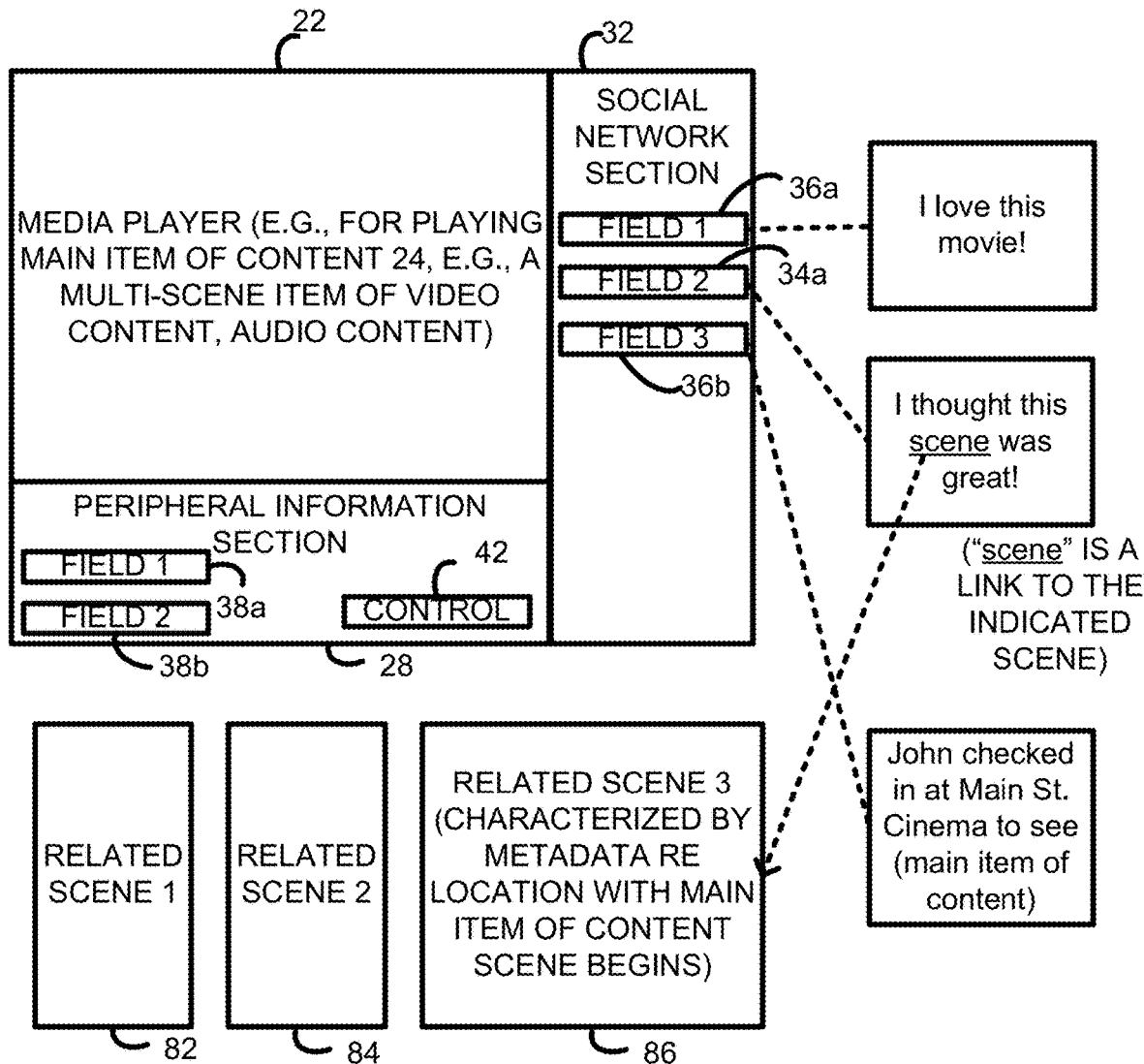
FIG. 6 is an exemplary implementation of a user interface according to present principles, showing in particular a related scenes section.

A user interface 18' in FIG. 6 illustrates the method of FIG. 5, and in particular exemplary such friends' posts, where the field 36a is a notation from a friend that they enjoyed the movie. The field 34a includes text and also a scene link to a scene particularly enjoyed by another friend. The scene link can appear in the field 34a or can be one of the "related scenes" (illustrated by thumbnails) described below, or both. Field 36b includes a notation that a friend "John" checked in at a movie theater to see the same movie (i.e., item of content). The social networking section can include contemporaneous remarks, e.g., made in response to the user posting that he or she is watching the item of content (such posts also being configurable to be automatic upon commencement of watching) or can include past remarks made about the item of content, filtered by the user's friends, and further filtered by metadata about the item of content (a URL, keyword, genre or other ways described above). In other words, entries in the social networking section may be contemporaneous, i.e., occurring during playback of the content, or can be drawn from past posts about the content.

In one example, a related content frame is presented below the peripheral information section or the social networking section (or both) and provides thumbnails 82, 84, and 86 of additional content, such as images and video clips from the movie, or related content items (e.g., movies with the same actor currently shown, other movies or episodes in a movie or television series, or recommended for the current user profile, e.g., via the use of friends data). In one example, additional frames or controls are provided to access more information and services, such as biographical information, polls, and trivia. In another implementation, some or all of the information is presented in additional windows rather than frames. Similarly, the size and position of the frames can vary depending on user action, playback status, and frame contents.

As noted the related content can be based on what the user's friends liked, commented on, or accessed. The related content may also be based on other users (not just friends), including other users of associated social networking sites or services, such as content reviewers, etc. Where the main item of content 24 is a multi-scene item of content, e.g., a movie or television program, friends (or for that matter, other users such as movie reviewers) may choose particular scenes as being iconic or otherwise worthy of consideration on their own. Scenes may also be included of related content, such as prequels, sequels, remakes, satires, and the like. In this case, the related content 82, 84, and 86 may include particular scenes, and not just entire content items. However, to avoid issues related with cutting or editing main items of content, the related scenes may be characterized by additional metadata regarding the location (in time) within the main item of content at which the scene begins. In this way, by selection of the related scene, e.g., related scene 3 indicated by reference 86, the user is not only directed to the indicated item of content but also to a particular location (in time) within the main item of content.

Figure 7:
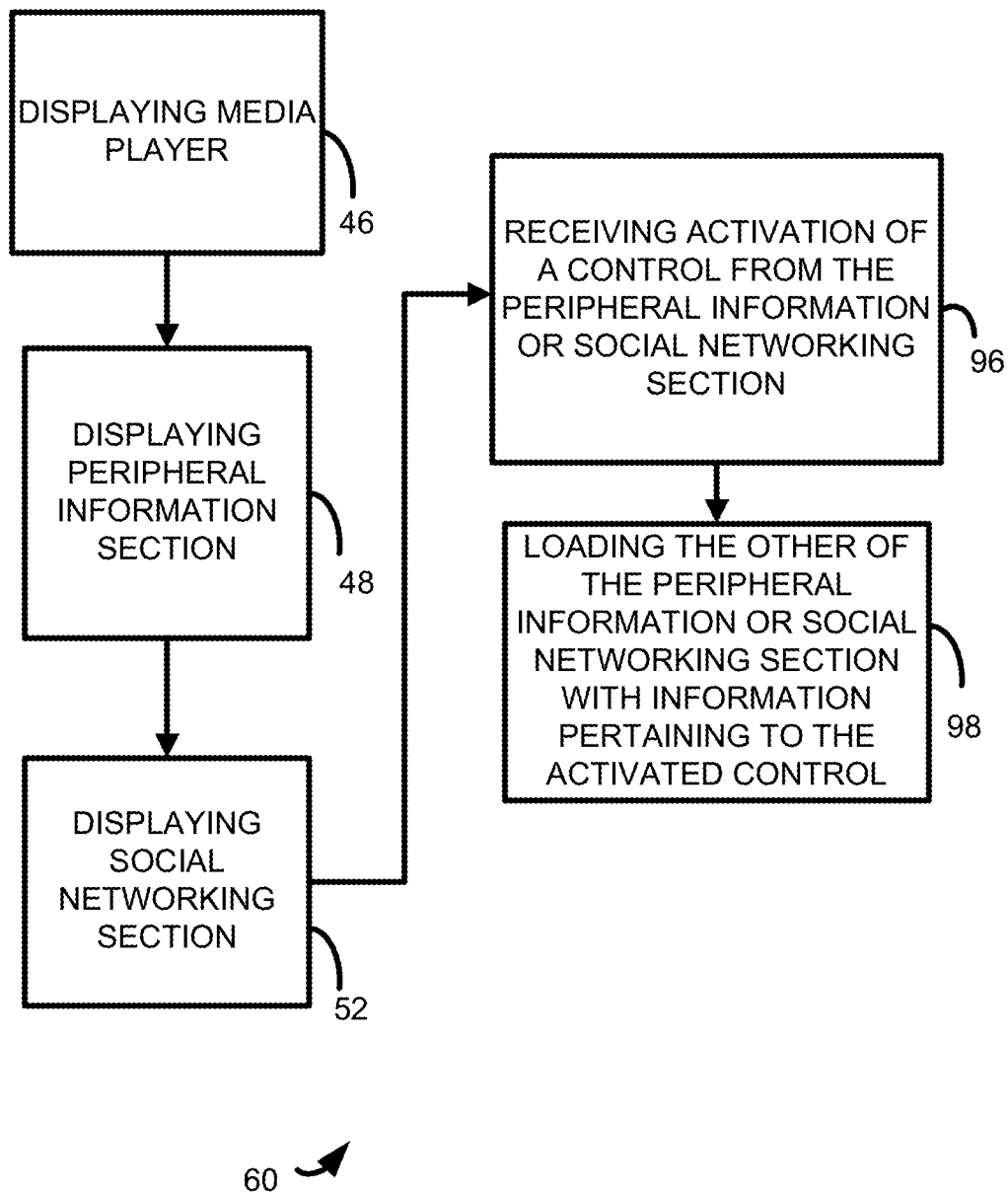
FIG. 7 is a flowchart of another method according to present principles.

Referring to the flowchart 60 of FIG. 7, in another implementation, activating a link or other control in the peripheral information section may cause the social networking section to be used for display of information and data pertaining to the activated control. Conversely, in yet another implementation, activating a link or other control in the social networking section causes the peripheral information section to be used for display of information and data pertaining to the activated control. That is, following the initial steps of 46, 48, and 52, a command may be received from the user via the user interface whereby the user activates the control from the peripheral information section or the social networking section (step 96). Information pertaining to the activated control may then be loaded into the other of the peripheral information or social networking sections (step 98). The information loaded may include editable forms.

For example, if a user clicks on a link within the peripheral information section pertaining to an actor, information about the actor, e.g., prior movies, social information, etc., may be loaded into the social networking section. In this way, the user continues to see the peripheral information section in the same way as before the element was activated. There is no need to, e.g., resize windows, move windows, or the like, in order to see the desired information, although such functionality may remain enabled within the user interface. In some implementations, expanded sections, e.g., either for social networking or peripheral information, may overlay a portion of the media player or other portions of the user interface.

Figure 8:
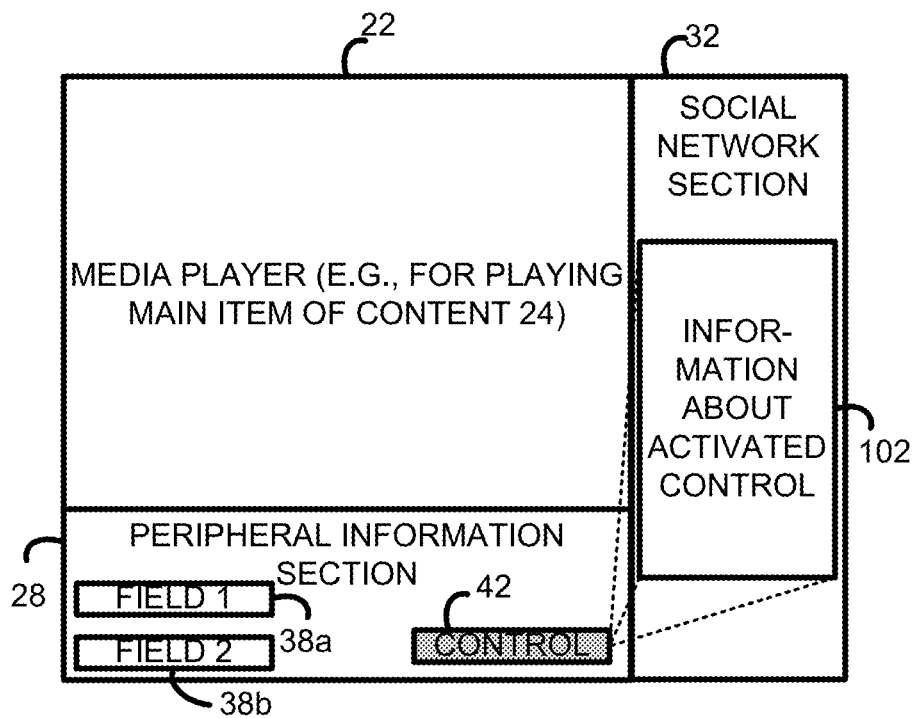
FIG. 8 is an exemplary implementation of a user interface according to present principles, showing in particular how activation of a control in the peripheral information section causes information or data related to the activated control to occupy the social networking section.
Figure 9:
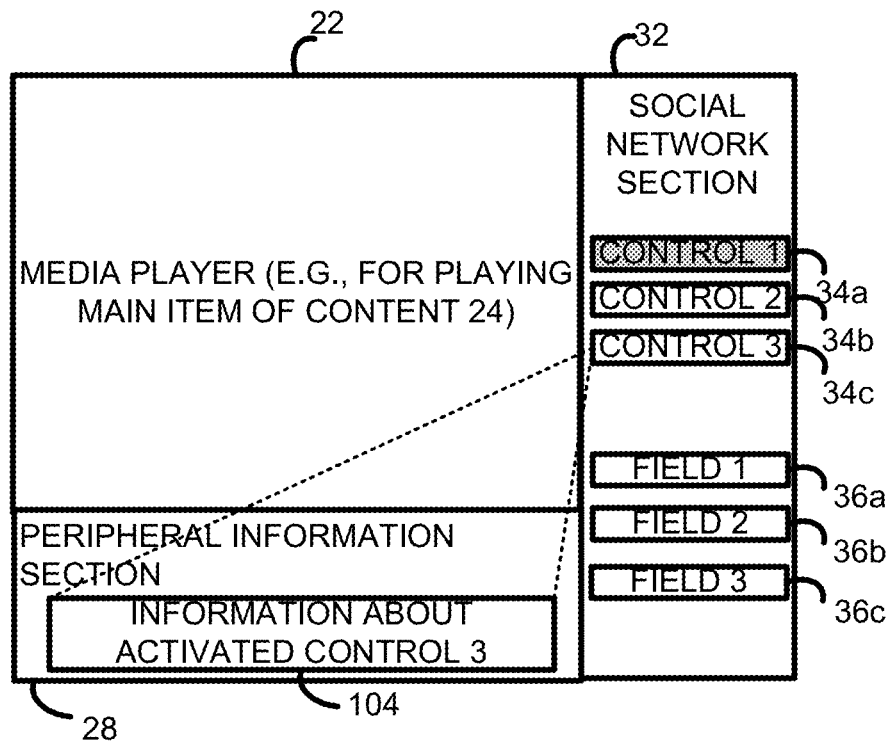
FIG. 9 is an exemplary implementation of a user interface according to present principles, showing in particular how activation of a control in the social networking section causes information or data related to the activated control to occupy the peripheral information section.

A first example is shown in FIG. 8. In this figure, activation of the control 42 within the peripheral information section 28 leads to an expanded portion 102 with information pertaining to the activated control, the expanded frame 102 within the social networking section 32. Another example is shown in FIG. 9. In the figure, activation of the control 34a within the social networking section 32 causes an expanded portion 104 to be created and to appear within the peripheral information section 28.

Specific examples are now described. In a first set of examples, the peripheral information section may control aspects of the social networking section. In one example, activating a link, e.g., clicking on the link, pertaining to an actor in the peripheral information section may cause information about the actor, e.g., biographical information, prior movies, or the like, to be displayed in the social networking section. Activating a link pertaining to a movie genre in the peripheral information section may cause the social networking section to be occupied by a list of other movies in the genre. Activating a link about a camera used in the production of the main item of content may lead to advertisements for the camera or other information about the same being displayed in the social networking section. Activating a link to another item of content, e.g., another movie featuring an actor from the main item of content, may lead to the linked content being displayed in the media player. Other variations will also be understood.

While the social networking section is employed in the above for the display of information keyed to the peripheral information section, the displayed information may still have or employ social elements. For example, as noted activating a link about an actor in the peripheral information section may cause information about the actor to appear in the social networking section. However, the information may be filtered or otherwise based on a user profile and/or data about social networking associated with the user. For example, the information about the actor may include comments made about the actor by the user's friends. Activating a genre link may lead to information posted by the user's friends about movies in the genre being displayed in the social networking section. Other variations will also be understood.

In a second set of examples, the social networking section controls the peripheral information section, particularly by activation of links in the former determining what is displayed in the latter. For example, activating a link in the social networking section may lead to relevant information being displayed in the peripheral information section. For example, activating the name of a friend in the social networking section may lead to all comments and posts about the main item of content, made by the selected friend, being displayed in the peripheral information section. If a displayed post in the social networking section notes that an actor in the main item of content is using a particular product, e.g., where the product is indicated by a hyperlink, activating the link to the product may cause advertisements or other information about the product to appear in the peripheral information section. Activating a link to another item of content, e.g., another movie suggested by a friend of the user, may lead to the linked content being displayed in the media player. Other variations will also be understood.

In yet a third set of examples, activating a button within the media player may cause expansion into the social networking section or peripheral information section of additional information, e.g., an enhanced set of controls from the media player. Conversely, in some cases activation of an element within the social networking section or peripheral information section can lead to a change in display of the media player. For example, if a link causes additional information about an actor to be displayed in either the peripheral information section or the social networking section, a picture of the actor can be displayed in the media player. This feature may lead to a pausing of the playback of the main item of content, or a minimization of the window as described below. Other variations will also be understood.

Figure 10:
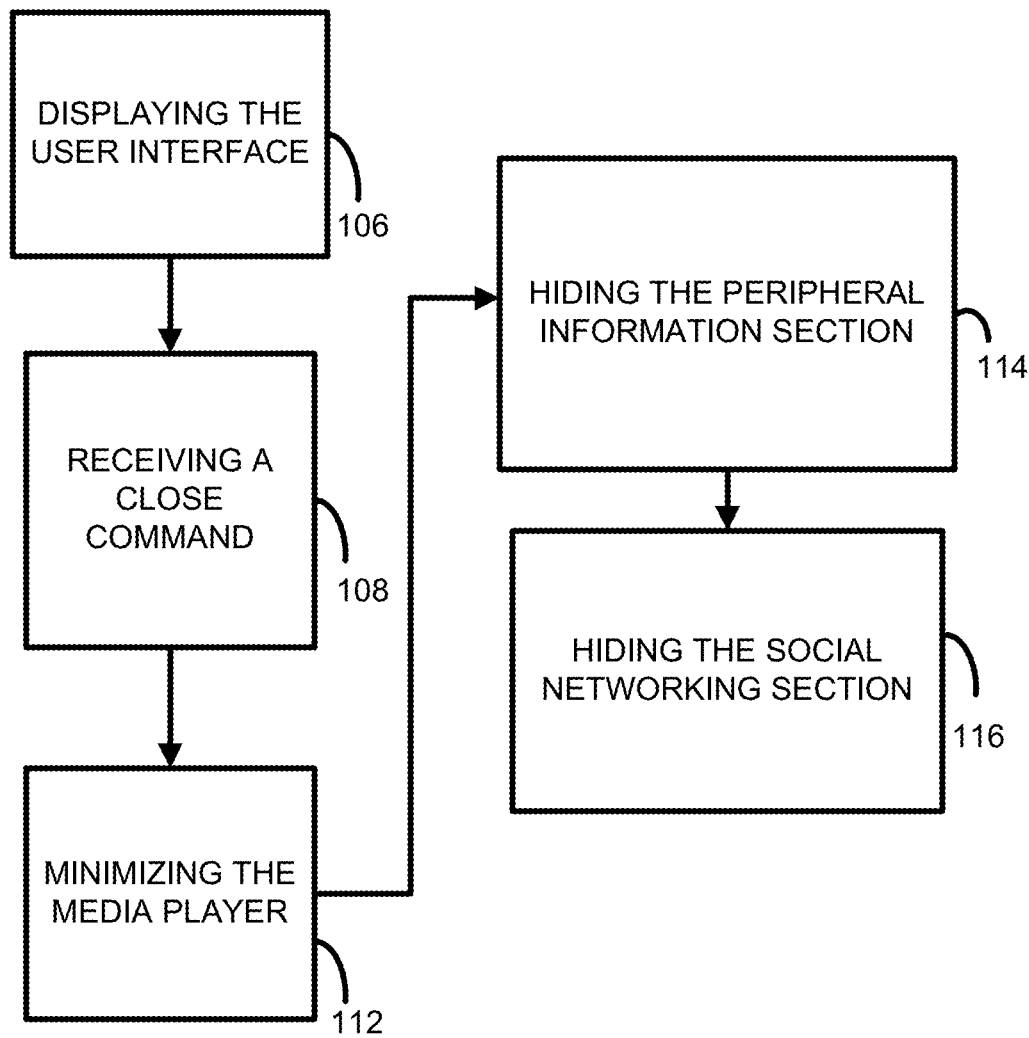
FIG. 10 is a flowchart of yet another method according to present principles.

Next, referring to the flowchart 70 of FIG. 10, in another implementation of a method according to present principles, users may conveniently access other information while continuing to watch a main item of content, even without using the peripheral information section and the social networking section. In particular, in this method a first step is to display the user interface (step 106). Upon receiving a close command (step 108), e.g., via a button on the UI, the media player is minimized (step 112), where this minimization still allows a small version of the media player (and thus the content) to be seen. This method may also include minimizing or hiding the peripheral information section (step 114), and minimizing or hiding the social networking section (step 116).

Figure 11:
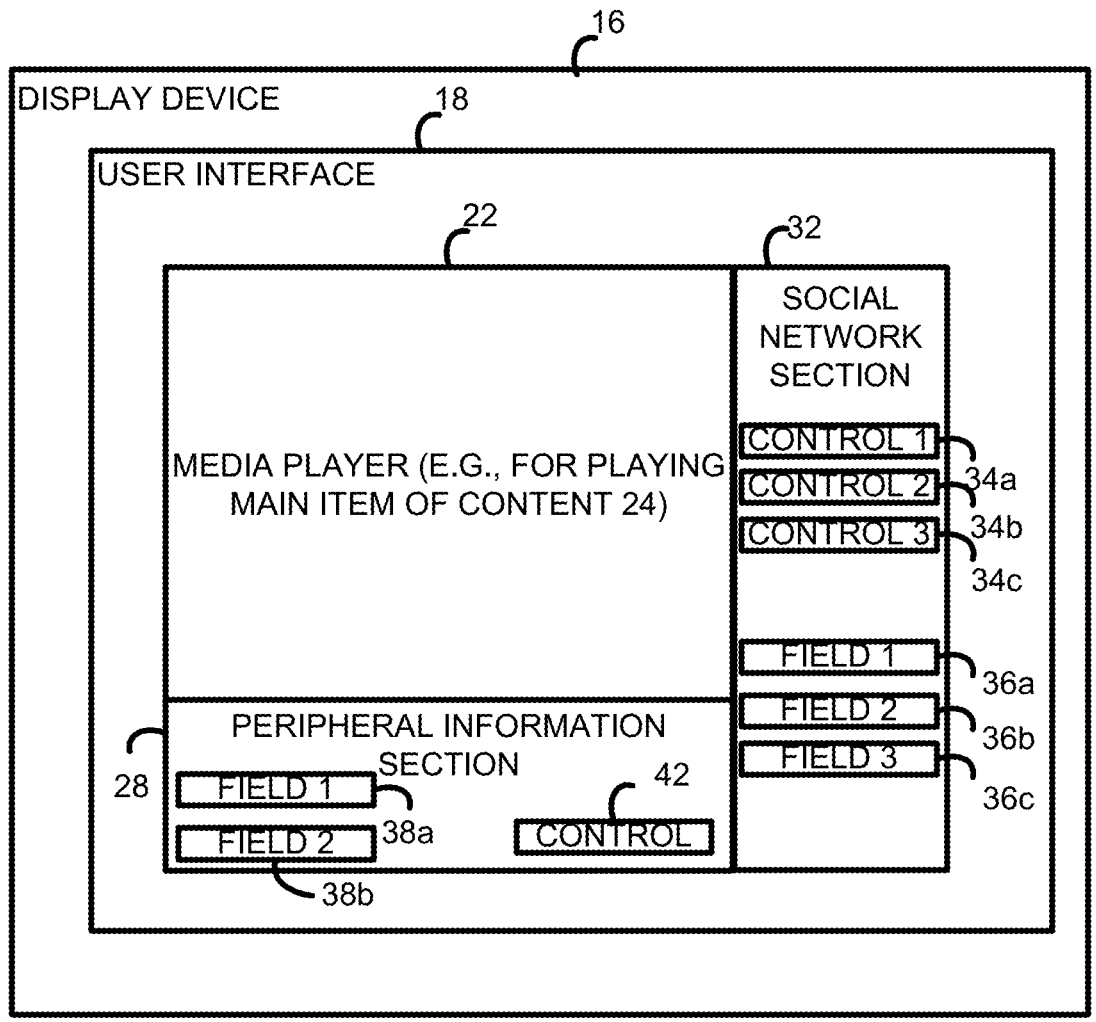
FIG. 11 is an exemplary implementation of a user interface according to present principles, showing in particular how a process of minimization allows viewing of a page along with contemporaneous viewing of a small media player.
Figure 11:
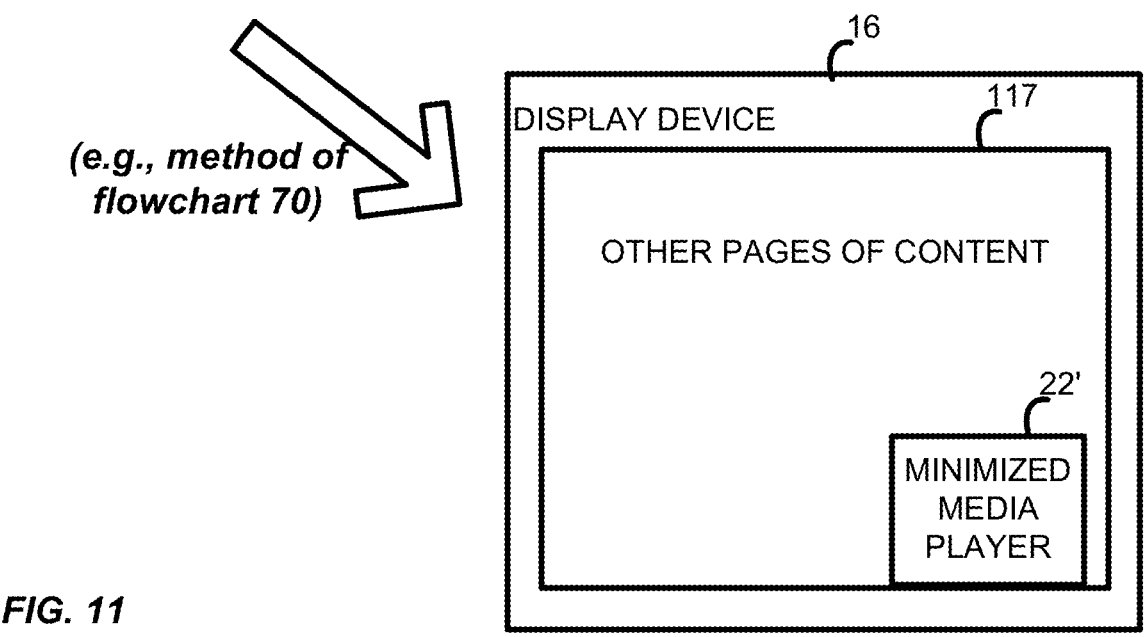

FIG. 11 illustrates one implementation of what may occur according to the method of flowchart 70. Instead of showing the user interface 18, the display device 16 shows a minimized media player 22', e.g., in the lower right-hand corner of the display device, allowing other pages of content 117 to be accessed and viewed. The media player 22' may be a modal window as noted above. A button on the minimized media player 22' may then allow the entire user interface 18 to again be shown, and the user may toggle between the two modes with appropriate buttons.

In a specific implementation, the user interface includes a control to hide or close the sidecar sections and present a full view for a given content item. In another implementation, the sidecar behavior can be managed using control settings (e.g., open automatically or not on playback start). In another implementation, when the user closes the sidecar (and/or the video player), the media application minimizes the video player as a layer or window above the content selection interface.

Other variations will also be understood.

Figure 12:
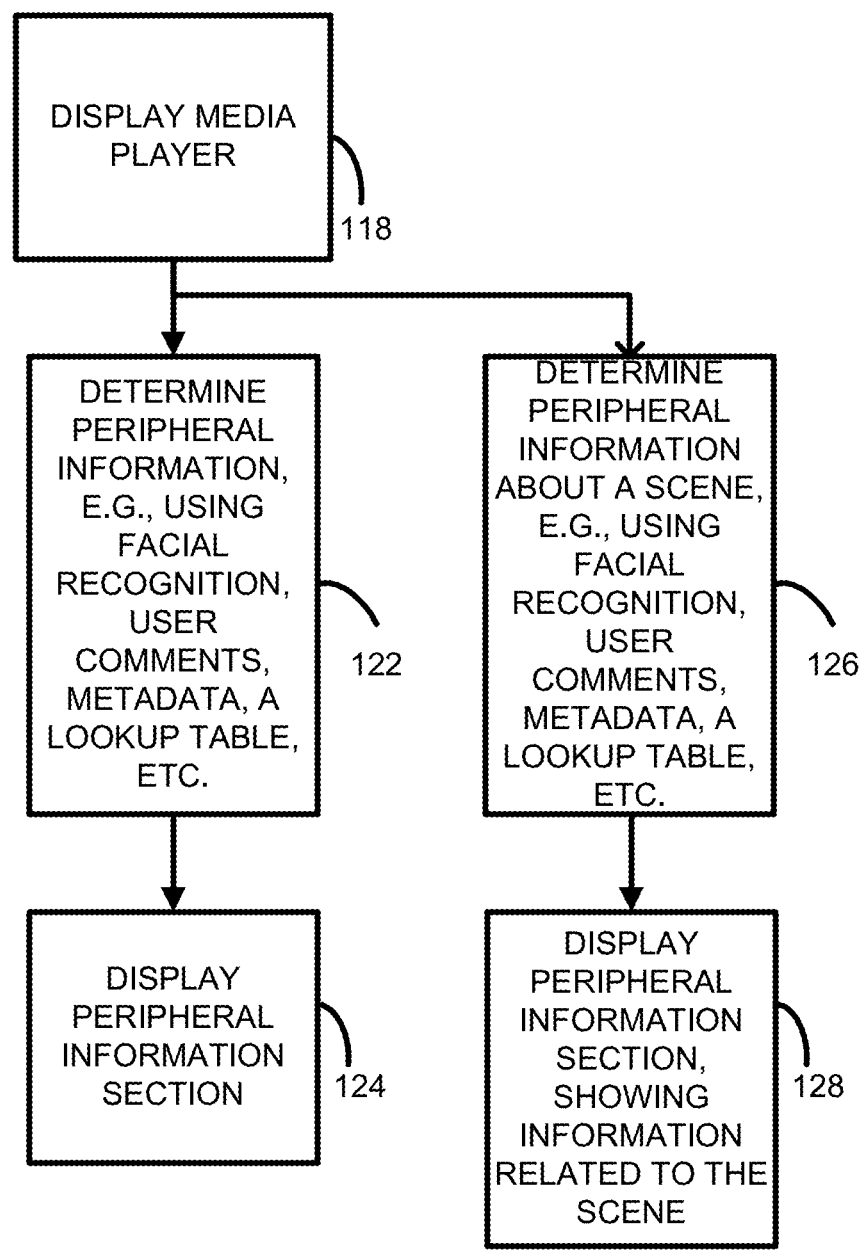
FIG. 12 is a flowchart of yet another method according to present principles.

FIG. 12 illustrates one method according to present principles to determine peripheral information. In a first step, the media player is displayed (step 118). Peripheral information may then be obtained for display in a number of ways. In one exemplary way, the peripheral information is determined by metadata accompanying the main item of content or retrieved at such time as the main item of content is played back. Peripheral information may also be obtained by facial recognition of actors within the main item of content, and such may be identified and listed as peripheral information. A lookup table may also be employed, e.g., a database listing actors and other metadata as indexed by a media signature, a media numerical or alphanumeric identifier stored within the metadata or within the downloaded or streamed file, or the like. The peripheral information section may then be displayed as determined (step 124).

The flowchart 80 also shows a more specific way of identifying peripheral information, this technique keyed to particular scenes. In more detail, facial recognition, user comments, metadata, or a lookup table is employed to determine specific peripheral information about a scene (step 126). Facial recognition may be especially useful, as the same may immediately identify actors within a scene. Metadata may further be employed if such metadata includes actor information keyed to timestamp or the like. In any case, peripheral information may then be displayed (step 128), the peripheral information specific to the scene and not just to the main item of content, which in this case is assumed to be a multi-scene item of content.

Figure 13:
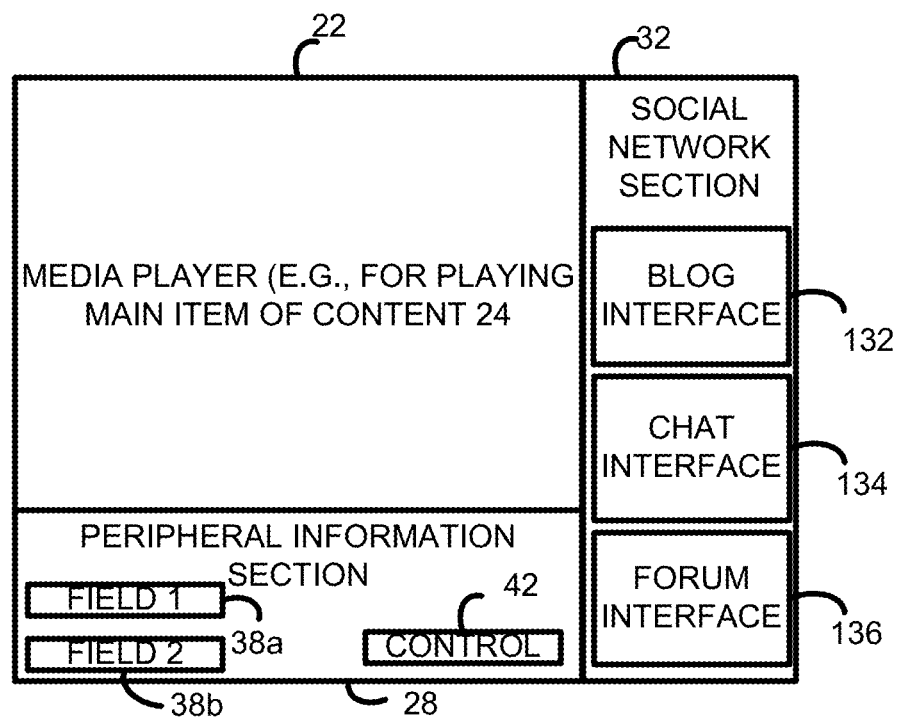
FIG. 13 is an exemplary implementation of a user interface according to present principles, showing in particular a blog interface, a chat interface, and a forum interface. The same are shown as part of the social networking section, but they may also be manifested as a portion of the peripheral information section.

Referring to FIG. 13, a user interface 18" is illustrated having additional components beyond what has previously been described. In particular, the user interface 18" further shows a blog interface 132, a chat interface 134, and a forum interface 136. These interfaces are shown as part of the social networking section 32, but it will be understood the same may also form a portion of the peripheral information section 28 or may even occupy an alternate additional frame or window. It will be understood that not all interfaces need be employed in a given implementation. The blog, chat interface, or forum, may be hosted on the same service providing the user interface or may be windows through which users may access and interact with third-party blogs, chat sites, or forums. Blogs and forums may generally be not "real-time" in the sense of user interaction with other users, i.e., such may tend to provide information and data about a main item of content (or related content) as posted by other users (or friends) in the past. Of course, in some cases real-time interaction in blogs and forums may still occur. Conversely, "chat" interfaces generally are configured for real-time interactions in the sense of one user inputting an entry in response to another user's entry, and so on. In some cases the chat interactions may occur in real-time even though only one user may be currently viewing the main item of content. In other cases, both users may be viewing the same item of content, where the plural users are consuming the content concurrently or are at different stages in the program. Where content is "live" or where a new item of content is being broadcast and many users are consuming the same (including the user and one or more friends), the "chat" interface may be especially useful for users to discuss what is currently happening in the show, as all users will see the same content at the same time.

Figure 14:
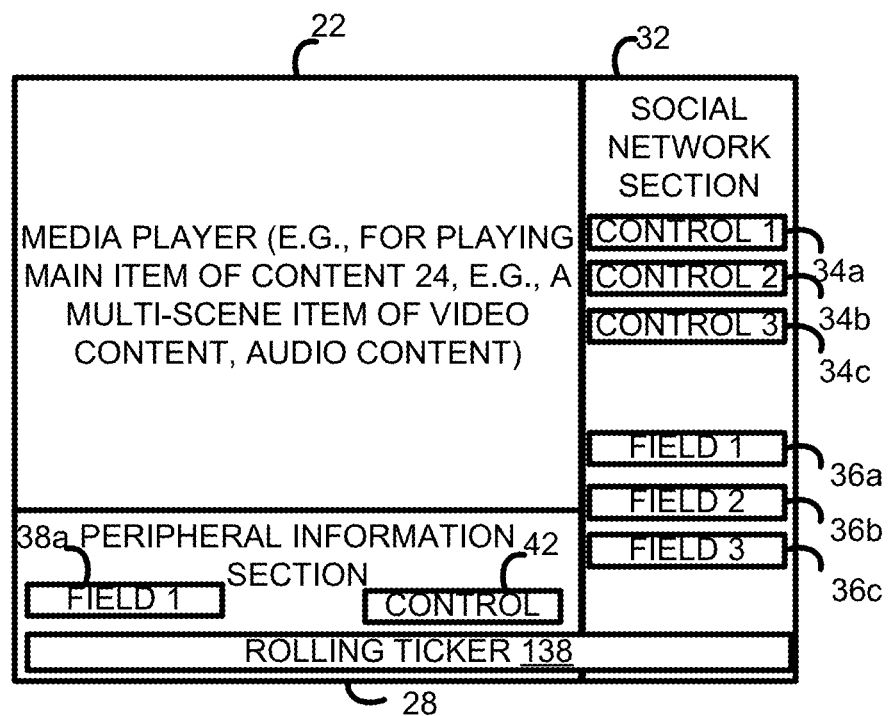
FIG. 14 is an exemplary implementation of a user interface according to present principles, showing in particular an implementation of a rolling ticker.

A user interface 18''' shown in FIG. 14 illustrates another sort of window or frame, in this case a rolling ticker 138. The rolling ticker 138 may occupy either of the peripheral information section or the social networking section, or both, or may occupy its own frame. The rolling ticker may appear in a similar way as a stock ticker, in which new or repeating (where there is a lack of new) updates are continuously displayed in a rolling fashion, rolling either horizontally or vertically with respect to the user interface. The content of such updates may vary, but will often be selected or extracted from posts about the main item of content (or related content) in the social networking site, news updates about the main item of content, or talent within the content or related content (including directors, actors, and other contributors). The posts or updates may be in real-time if viewers are currently consuming the content, or may be drawn from past posts. If drawn from past posts, the ticker may preferentially show more recent posts and less preferentially show older posts, e.g., older comments made by the user's friends. The rolling ticker may include activatable elements, such that a user may click on an element within the ticker and have the peripheral information section or social networking section (or other section) expand to display information pertaining to the element activated. The rolling ticker may form a portion of the peripheral information section or a portion of the social networking section, or each may have its own rolling ticker for relevant information. For example, a rolling ticker in the social networking section may present information about friends' posts, while a rolling ticker in the peripheral information section may include supplemental information about the main item of content. A rolling ticker may also be provided in its own section, or may extend and scroll across multiple sections. In some implementations, the rolling ticker may be provided within the media player section.

Figure 15:
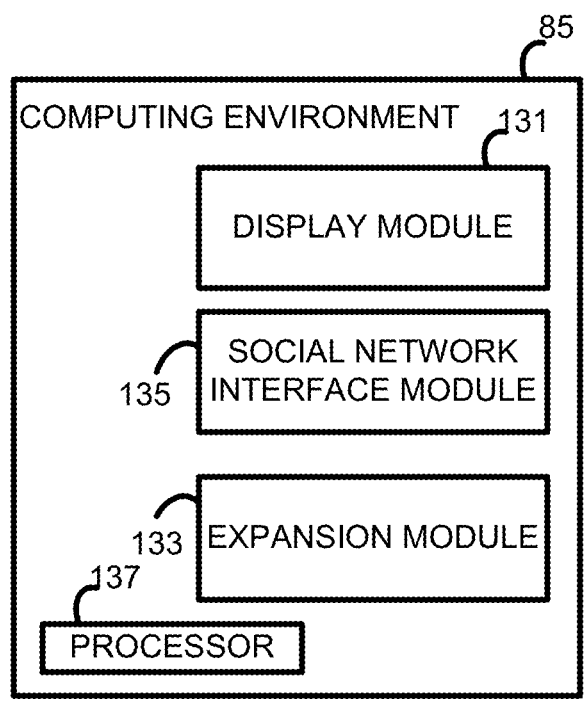
FIG. 15 illustrates an exemplary schematic modular computing environment which may be employed to operate a user interface according to present principles.
Figure 16:
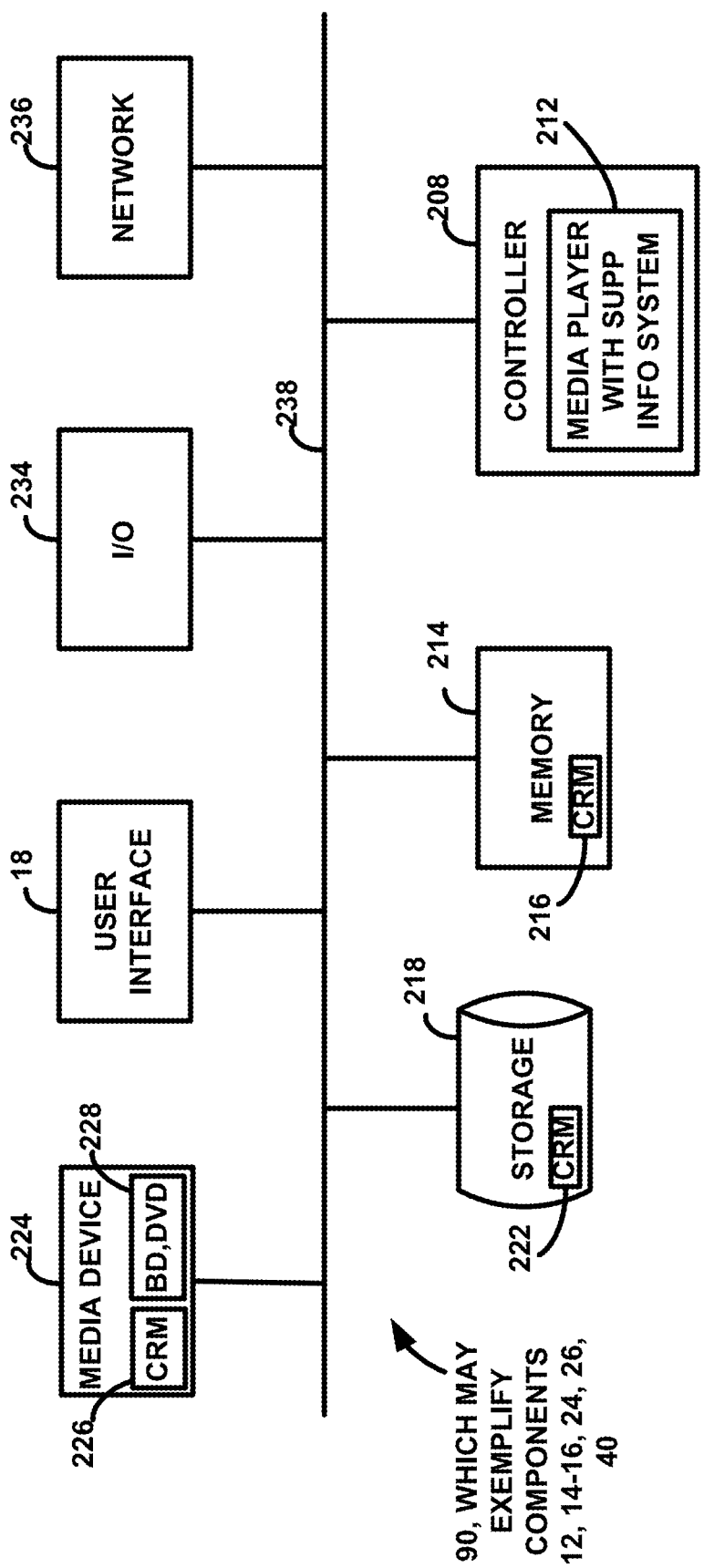
FIG. 16 illustrates an exemplary schematic computing environment which may be employed as certain of the components described.

FIG. 15 illustrates a modular depiction of a computing environment 85 in which certain implementations according to present principles may be embodied. The computing environment 85 generally runs on a processor 137 and includes a display module 131. The display module 131 acts to display the sections noted above, including the media player, the peripheral information section, and the social networking section. The display module can work with a communications module (not shown) to obtain and display the main item of content in the media player. A social network interface module 135 may be employed to communicate with one or more social networking sites or services using an appropriate API. For example, the social network interface module 135 may receive data about posts from a user's friends pertaining to a main item of content, the data then being displayed using the display module 131. The social network interface module 135 may similarly be employed to post data from the subject user based on the main item of content to one or more associated social networking sites or services. The social network interface module 135 may further be employed to extract data from the peripheral information section, e.g., from a data set associated with the peripheral information section, and to use the same on which to base an entry or post in an associated social networking site or service.

An expansion module 133 may be provided which serves to expand one or more activatable elements. It is noted that in this sense the term "expand" need not necessarily mean to make a window or frame larger, but rather to expand the amount of available data and to display the same within a frame or window. For example, the expansion module 133 may be employed to expand peripheral information into the social networking section, particularly upon reception of an expansion command, such as the activation of a link within the peripheral information section. In the same way, the expansion module 133 may be employed to expand social networking information into the peripheral information section, particularly upon reception of an activation of a link within the social networking section. In this sense the expansion module 133 may also transfer data from one data set to another, e.g., from a social networking data set to a peripheral information data set, and vice versa. In some implementations, expansion may also occur into the media player section using this module.

Other modules will be understood to accomplish or enhance the functionality described herein.

What has been described are systems and methods relating to a user interface including supplemental and social information. In some implementations, the user interface may be conveniently seen without scrolling, and peripheral information about a played-back content item as well as social networking tools may also be enabled.

Additional variations and implementations are also possible. For example, while the examples above focus on a video player and a movie, the media player application can support other content and playback such as television or web programming, images, game software, music or audio content. Content can further include data, images, or documents for review by professionals in business, medicine, law, and so on. For example, while viewing a medical image, a peripheral information section may be employed to access other data about the patient, while a social networking section may be employed to access information about other patients of the clinic, relatives of the subject patient, and the like. Similarly, other social services and interaction controls can also be used, such as voting or rating mechanisms, content or image sharing services, or other types of communications (e.g., video chat). As another example, while the above description has included "expansions" of an activatable link into one or the other of the social networking section and peripheral information section, further expansions into one or the other section may be had by activating an element within the expanded information area within the section, or by another user action, e.g., swiping the screen. Users may be enabled to control what is in the peripheral information and social networking sections by the use of appropriate controls and settings functionality.

As noted above, while viewing an item of content, users may see displayed in the social networking section prior or contemporaneous comments from friends (or other users, such as reviewers or the like) about the main item of content. In yet another variation, such postings may be provided in the social networking section aligned in time with when the friends or other users made the postings originally. In other words, a subject user may be provided with such postings at points in time during playback of the content, the points in time the same (relative to play back of the content) as when friends or other users made such postings. As an example, if a friend posted to a social networking site during a wedding scene of the content, the post may appear to the subject user at the same time during the wedding scene. This functionality may be accomplished in a number of ways. In one way, a "relative" timestamp may be stored along with the posted comments, the relative timestamp noting a point in time during playback at which the comment was posted. Such relative timestamps may take account of commercial or other time breaks, or may not, so long as the method of calculating the relative timestamp is available to the future posting method, e.g., the method of flowchart 50. As another way of accomplishing the functionality, if comments are made during an initial broadcast of an item of content, then a relative timestamp may be calculated by subtracting the time of day at which the broadcast began from the time of day at which the comment was posted. Various other methods of aligning comments in time will be understood. Moreover, such functionality may be extended to books and other media that users consume over a period of time and make comments on during the period of consumption.

Such functionality may be even further extended, as users may enjoy an item of content and then, upon a re-watching of the same, make new comments or edit previously-entered comments. That is, notes may be attached by the user later and at the location they desire in the content stream. This functionality may be accomplished as noted above, e.g., by watching the content again and making or editing comments, or alternatively by the use of standard video commenting tools, such as are employed in the motion picture industry for commenting on draft footage.

Accordingly, the techniques are not limited to the specific examples described above.

One implementation includes one or more programmable processors and corresponding computer system components to store and execute computer instructions, such as to provide the content playback and UI control, the selection and presentation of peripheral information, and the social tool interfaces. One such computing environment is disclosed below.

Referring to FIG. 15, a representation of an exemplary computing environment 90 is illustrated as an example of how one or more systems according to present principles may be implemented. These systems may include, e.g., components indicated herein by reference numerals 12, 14-16, 24, 26, and 40.

The computing environment 90 includes a controller 208, a memory 214, storage 218, a media device 224, a user interface 18, an input/output (I/O) interface 234, and a network interface 236. The components are interconnected by a common bus 238. Alternatively, different connection configurations can be used, such as a star pattern with the controller at the center.

The controller 208 includes a programmable processor and controls the operation of a media player with supplemental information system 212. The controller 208 loads instructions from the memory 214 or an embedded controller memory (not shown) and executes these instructions to control the system.

Memory 214, which may include non-transitory computer-readable memory 216, stores data temporarily for use by the other components of the system. In one implementation, the memory 214 is implemented as DRAM. In other implementations, the memory 214 also includes long-term or permanent memory, such as flash memory and/or ROM.

Storage 218, which may include non-transitory computer-readable memory 222, stores data temporarily or long-term for use by other components of the system, such as for storing data or instructions. In one implementation, the storage 218 is a hard disc drive, a solid state drive, or cloud storage.

The media device 224, which may include non-transitory computer-readable memory 226, receives removable media and reads and/or writes data to the inserted media. In one implementation, the media device 224 is an optical disc drive or disc burner, e.g., a writable Blu-ray® disc drive 228.

The user interface 18 includes components for accepting user input, e.g., the user activation of controls and other links. The controller 208 uses inputs entered by the user to adjust the operation of the computing environment.

The I/O interface 234 includes one or more I/O ports to connect to corresponding I/O devices, such as external storage or supplemental devices, e.g., a printer or a PDA. In one implementation, the ports of the I/O interface 234 include ports such as: USB ports, PCMCIA ports, serial ports, and/or parallel ports. In another implementation, the I/O interface 234 includes a wireless interface for wireless communication with external devices.

The network interface 236 allows connections with the local network and includes a wired and/or wireless network connection, such as an RJ-45 or Ethernet connection or Wi-Fi interface (802.11). Numerous other types of network connections will be understood to be possible, including WiMax, 3G or 4G, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

One or more systems and methods according to present principles may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file-storing medium. The outputs may be delivered to a user by way of a video graphics card or integrated graphics chipset coupled to a display that maybe seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the above system including control of a media player, peripheral information, and social networking controls or tools, the plural inputs may allow plural users to control the user interface at the same time.

What is claimed is:

1. A method for controlling a user interface in a computer system, comprising:
    a. displaying a media player in a user interface displayed on a display device, the media player for displaying a multi-scene item of video content;
    b. displaying a peripheral information section in the user interface, the peripheral information section for displaying information about the multi-scene item of video content, wherein the peripheral information section is generated based on metadata associated with the multi-scene item of video content and a lookup table that includes a database listing actors and other metadata as indexed by a media signature, wherein the media signature is a media numeric or alphanumeric identifier stored within the metadata, and wherein the peripheral information section is configured to show specific information about a current scene of the multi-scene item of video content being played back in the media player, wherein the specific information is based on the metadata associated with the current scene of the multi-scene item of video content, and further determined based on user comments about the scene in a social networking service or media sharing site;
    c. generating and displaying a social networking section in the user interface, including one or more social networking controls, the social networking section associated with a user profile, and wherein the social networking section is generated based on data about a plurality of users' respective interests in the multi-scene item of video content, the plurality of users including users associated as friends with the user profile;
    d. receiving a command to activate a selected one of the social networking controls; and
    e. sending information about the multi-scene item of video content to one or more social networking services associated with the social networking section based on the received command to activate the selected one of the social networking controls;
    f. wherein the displaying steps of displaying a media player, displaying a peripheral information section, and displaying a social networking section, are configured such that respective data sets corresponding to the displayed sections are accessed substantially simultaneously, are substantially simultaneously displayed, and further are updated substantially simultaneously, whereby the system enables access to three data sets in a controlled and efficient manner.

2. The method of claim 1, wherein the user interface is a modal window.

3. The method of claim 1, further comprising:
    a. receiving a close command;
    b. minimizing the media player; and
    c. hiding the peripheral information section and social networking section.

4. The method of claim 1, further comprising configuring a related media section to appear in the user interface, the related media section displaying links or thumbnails to media viewed, liked, or commented on by other users of the one or more social networking services.

5. The method of claim 4, wherein the media viewed, liked, or commented on by the plurality of users includes scene links to scenes from the multi-scene item of video content, the scene links including metadata about where the scene begins in the multi-scene item of video content, such that activation of the scene link causes playback to begin at the beginning of the scene, whereby the scene may be shared without editing the multi-scene item of video content.

6. The method of claim 1, wherein the users' respective interests are determined by views, likes or comments on the multi-scene item of video content, the views, likes, or comments associated with the multi-scene item of video content by association with a URL or with metadata of the multi-scene item of video content.

7. The method of claim 1, wherein the users' respective interests are determined by likes or comments on the multi-scene item of video content, the likes or comments determined to be associated with the multi-scene item of video content by a likeness in keywords.

8. The method of claim 7, wherein the users' respective interests are determined by the friends' mentions of a title of the multi-scene item of video content in entries in the social networking services.

9. The method of claim 1, wherein the social networking section includes social network links to a plurality of social networking services.

10. The method of claim 9, wherein the social network links access feeds to the social networking services.

11. The method of claim 10, wherein upon activation of a social network link, metadata about the played back content item is converted to a form appropriate for the accessed feed.

12. The method of claim 9, wherein upon activation of a social network link, a posting to a social network corresponding to the activated link is performed, the posting including metadata about the played back content item extracted from the peripheral information section.

13. The method of claim 10, wherein the social networking section further includes a user editable form configured to allow a user to enter text, such that the entered text can be converted to a form appropriate for the accessed feed and posted on the social network.

14. The method of claim 1, wherein the social networking section includes a chat interface.

15. The method of claim 1, wherein the social networking section includes a forum interface.

16. The method of claim 1, wherein the social networking section includes a blog interface.

17. The method of claim 1, further comprising displaying a rolling ticker within a frame.

18. The method of claim 17, wherein the rolling ticker includes information drawn from friends' posts on the social networking services related to the multi-scene item of video content being played back on the media player.

19. The method of claim 1, further comprising causing a related media section to appear in the user interface, the related media section displaying links or thumbnails to media related to content being played back.

20. The method of claim 1, further comprising, upon activation of a link in the peripheral information section or the social networking section, causing the other of the peripheral information section or the social networking section to be occupied by a frame or window corresponding to the activated link.

21. The method of claim 20, wherein upon activation of a link in the peripheral information section, displaying information in the social networking section, the information corresponding to the results of the activated link in the peripheral information section.

22. The method of claim 20, wherein upon activation of a link in the social networking section, displaying information in the peripheral information section, the information corresponding to the results of the activated link in the social networking section.

23. The method of claim 1, further comprising, upon activation of a link in the peripheral information section or the social networking section, causing the other of the peripheral information section or the social networking section to be occupied by a frame or layer or window corresponding to the activated link, and wherein the occupying frame or layer or window, corresponding to the activated link, includes information based at least in part on the user profile.

24. The method of claim 23, wherein the information based at least in part on the user profile includes friends information.

25. The method of claim 24, wherein the friends information includes posts or other social networking entries based on the multi-scene item of video content or metadata therefrom.

26. The method of claim 1, further comprising, upon activation of a link in the peripheral information section or the social networking section, causing the peripheral information section or the social networking section, respectively, to be occupied by a frame or layer or window corresponding to the activated link.

27. The method of claim 1, further comprising sizing and configuring the user interface for the display device such that the media player, the peripheral information section, and the social networking section are visible in their entirety on the display device without scrolling, while each of the peripheral information section and the social networking section are individually scrollable.

28. The method of claim 1, wherein the user interface is part of a web application.

29. The method of claim 28, wherein the web application is associated with a social networking site or a media sharing site.

30. The method of claim 1, wherein the user interface is a client application on the computer system, the client application in communication with a service.

31. The method of claim 30, wherein the service is a social networking site or a media sharing site.

32. A non-transitory computer-readable medium, comprising instructions for causing a computing environment to perform the method of claim 1.

33. A system for controlling a user interface in a computing environment, comprising:
  a. a display module for displaying a user interface on a display device, the user interface including:
    i. a media player for displaying a multi-scene item of video content;
    ii. a peripheral information section for displaying information about the multi-scene item of video content, wherein the peripheral information section is generated based on metadata associated with the multi-scene item of video content and a lookup table that includes a database listing actors and other metadata as indexed by a media signature, wherein the media signature is a media numeric or alphanumeric identifier stored within the metadata, and wherein the peripheral information section is configured to show specific information about a current scene of the multi-scene item of video content being played back in the media player, wherein the specific information is based on the metadata associated with the multi-scene item of video content and further determined based on user comments about the scene in a social networking service or media sharing site; and
  b. a social networking section including one or more social networking controls, the social networking section associated with a user profile, and wherein the social networking section is generated based on data about a plurality of users' respective interests in the multi-scene item of video content, the plurality of users including users associated as friends with the user profile; and
  c. an expansion module for, upon reception of a command to display additional information pertaining to an activated element within the peripheral information section or the social networking section, causing the additional information pertaining to the activated element to be displayed within the other of the peripheral information section or the social networking section.

34. A system for controlling a user interface in a computing environment, comprising:
  a. a display module for displaying a user interface on a display device, the user interface including:
    i. a media player for displaying a multi-scene item of video content;
    ii. a peripheral information section for displaying information about the multi-scene item of video content, wherein the peripheral information section is generated based on metadata associated with the multi-scene item of video content and a lookup table that includes a database listing actors and other metadata as indexed by a media signature, wherein the media signature is a media numeric or alphanumeric identifier stored within the metadata, and wherein the peripheral information section is configured to show specific information about a current scene of the multi-scene item of video content being played back in the media player, wherein the specific information is based on the metadata associated with the multi-scene item of video content and further determined based on user comments about the scene in a social networking service or media sharing site; and
b. asocial networking section including one or more social networking controls, the social networking section associated with a user profile, and wherein the social networking section is generated based on data about a plurality of users' respective interests in the multi-scene item of video content, the plurality of users including users associated as friends with the user profile; and
c. a social network interface module for, upon reception of a command from the social networking control to post an entry pertaining to the multi-scene item of video content to a social networking service, extracting metadata from the peripheral information section, the social network interface module configured to construct the post at least partially based on the extracted metadata.

* * * * *